Nov. 19, 1929.  W. H. MILLER  1,736,616
PARKING AND GUIDE LIGHT FOR AUTOMOBILES
Filed Aug. 2, 1928
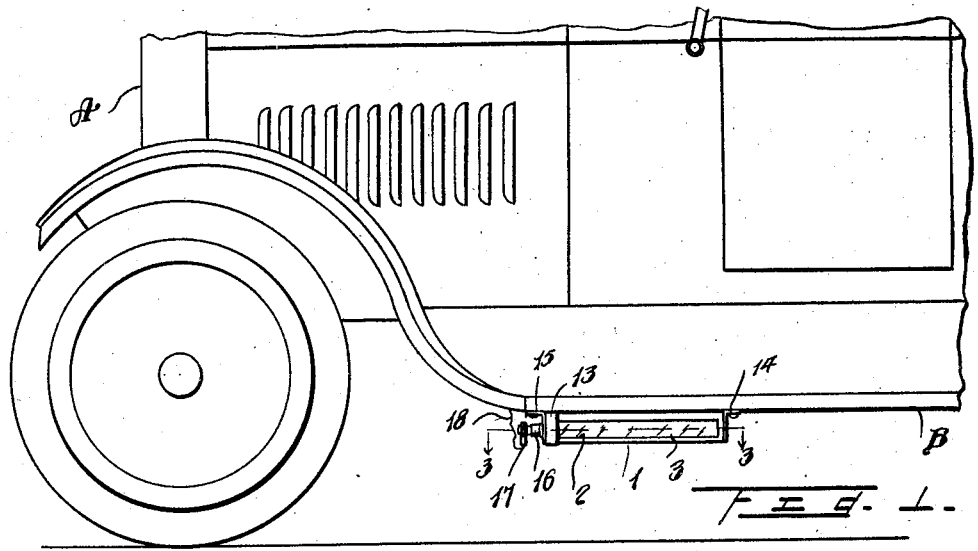
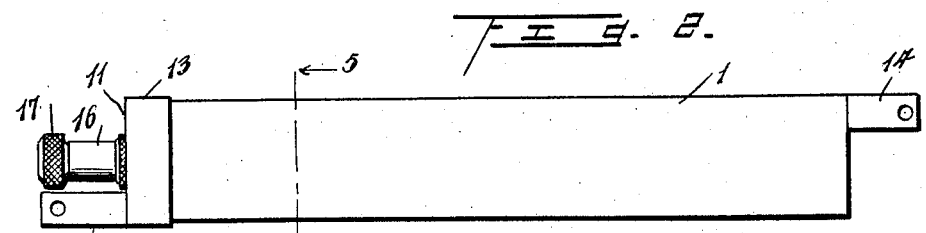
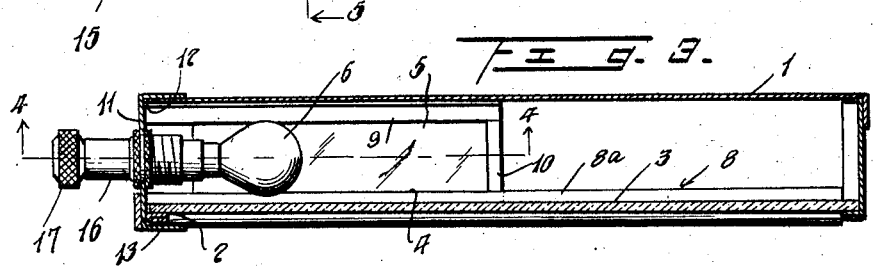
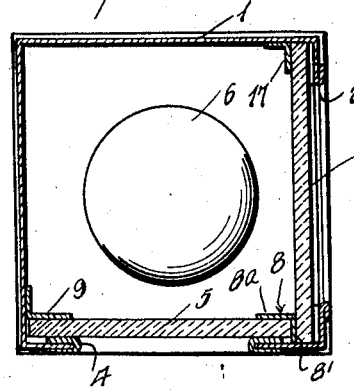
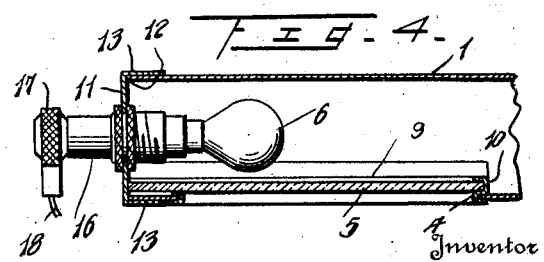
Inventor
W. H. Miller.

Patented Nov. 19, 1929

1,736,616

UNITED STATES PATENT OFFICE

WILLIAM H. MILLER, OF SUNBURY, PENNSYLVANIA, ASSIGNOR OF ONE-HALF TO CHARLES J. REITZ, OF SUNBURY, PENNSYLVANIA

PARKING AND GUIDE LIGHT FOR AUTOMOBILES

Application filed August 2, 1928. Serial No. 297,047.

The invention relates to a lamp casing adapted to be secured to the under side of a running board of an automobile and provided with a colored transparent panel in the outer side face thereof that is visible to traffic and serves to protect the side of the vehicle from traffic, and also to clearly define the running board for convenience of passengers entering the vehicle, and also provided with a clear panel in the underside thereof to throw the light on the road under the running board and at the rear of the front wheel to clearly define the position of the front wheel for convenience of the driver in driving out from a parking space.

A further object of the invention is the provision of an improved construction of lamp casing for the purpose stated, comprising an elongated casing, preferably rectangular in cross section, and open at one of its ends, and providing a slip-on cap or closure for the open end in which the socket for an electric lamp bulb is secured, the casing having an opening in one of its sides and in the bottom to receive transparent panels that are slidably mounted in the casing from the open end and held in position in the casing by the closure cap, the casing and the cap being provided with ears to receive driven fastenings to engage the under side of the running board of a motor vehicle.

The invention will be described in detail hereinafter and will be found illustrated in the accompanying drawings in which Figure 1 is a side view of a fragment of a motor vehicle, showing the improved parking and guide light secured to the under side of the running board thereof, Figure 2 is a stop view of the lamp casing, Figure 3 is a longitudinal sectional view on a horizontal plane indicated by the line 3—3 of Figure 1, Figure 4 is a fragmental longitudinal sectional view on a vertical plane indicated by the line 4—4 of Figure 3, and Figure 5 is a transverse sectional view on a plane indicated by the line 5—5 of Figure 2.

In the drawings similar reference characters are used to designate corresponding parts throughout the several views.

The invention is an accessory for automobiles, and in the drawings an automobile is shown in Figure 1 at A having a running board B to which the accessory comprising a parking and guide light is secured and comprising an elongated casing 1 that is preferably rectangular in cross section as clearly shown in Figure 5 and provided with an opening 2 extended substantially the full length of the casing and having a panel of transparent material 3 mounted therein that is preferably colored green, and said opening 2 being located in the wall of the casing 1 presented outwardly of the running board serves to protect the side of the vehicle from collison by traffic, and also to define the height of the running board for the convenience of passengers entering the vehicle. The casing 1 is also provided with an opening 4 in the under wall thereof that is covered by a panel of clear glass or other transparent material designated 5, said panel being located at the end of the casing toward the front wheel, so that the rays of light from the lamp 6 that is mounted as will be hereinafter described in the casing will be thrown on the roadway under the running board and toward the adjacent front wheel and serves to indicate to the operator the angular position of the front wheel and to assist thereby in driving out of a parking space.

7 indicates an angular strip that is preferably secured to the upper wall of the casing 1 and spaced from the side wall defining the opening 2 to form a guide for the panel 3 at its upper edge, while 8 indicates an angular member secured by one of its edges to the bottom wall of the casing and has one of its flanges 8' spaced from the lower portion of the wall defining the opening 2 to form a guide for the lower edge of the panel 3, while the flange 8ª is spaced from the bottom wall to form a guide for one edge of the panel 5. 9 indicates another angular strip forming the guide for the other side edge of the panel 5 and secured to the back wall of the casing 1. 10 indicates a transverse strip secured to the bottom wall and forming a stop for the inner edge of the panel 5 when in position. 11 indicates a closure for the open end 12 of the casing 1 and having flanges 13 to engage the top and bottom and the side walls of the casing to hold the members in relation to one another, the casing 1 being provided with an ear 14 and the member 11 with an ear 15 for securing the lamp casing in position on the running board, the securing means obviously holding the members 1 and 11 in engagement. Secured to the member 11 is a conventional socket 16 for the lamp 6 and the plug 17, and 18 is a wire secured in said plug 17 and connected with a source of electric current to energize the lamp 6.

It will be apparent that the device is extremely simple in character and therefore reasonable in cost of manufacture, and that the cover member 11 serves a dual purpose in holding the panels 3 and 5 in position in the casing and at the same time carries the illuminating member 6 and its connection, so that when in position on a running board in event it is necessary to renew the lamp or to renew either or both of the panels 3 and 5, this can be done by removing the driven fastening engaging the ear 15 and swinging the lamp casing outwardly of the running board on the driven fastening engaging the ear 14 as a pivot and then sliding the cap or cover member 11 from the end of the casing 1 thus exposing the lamp should renewal be required and making it possible to remove the panels 3 and 5 in event they require replacement.

What is claimed is:—

1. A parking and guide light for motor vehicles, comprising a casing adapted to be secured under the running board of a motor vehicle, said casing provided with an opening presented outwardly of and an opening presented downwardly of said running board, guide means arranged at the sides of said openings, transparent panels engaging in said guide means and slidable therein, means to illuminate the interior of said casing and an end wall of said casing removably engaged thereon and holding said panels in position in said guide means, said end wall being removable for installation and removal of the panels of the illuminating means.

2. A parking and guide light for motor vehicles, comprising a casing adapted to be secured under the running board of a motor vehicle, said casing provided with an opening presented outwardly of and an opening presented downwardly of said running board, guide means arranged at the sides of said openings, transparent panels engaging in said guide means and slidable therein, one of the walls of the casing being removable therefrom and having flanges engaging the adjacent walls of the casing, a lamp socket secured to said removable wall and adapted to hold a lamp, said wall adapted to hold said panels in position in the casing, and ears on said casing and the removable wall for securing the casing in position on the running board.

In testimony whereof I affix my signature.

WILLIAM H. MILLER.